W. F. WARNEFORD.
HORSE BLANKET RETAINER.
APPLICATION FILED FEB. 23, 1921.

1,425,301.                                          Patented Aug. 8, 1922.

UNITED STATES PATENT OFFICE.

WETHERELL FRANCIS WARNEFORD, OF LONDON, ENGLAND.

HORSE-BLANKET RETAINER.

1,425,301.  Specification of Letters Patent.  Patented Aug. 8, 1922.

Application filed February 23, 1921. Serial No. 447,251.

(GRANTED UNDER THE PROVISIONS OF THE ACT OF MARCH 3, 1921, 41 STAT. L., 1313.)

*To all whom it may concern:*

Be it known that I, WETHERELL FRANCIS WARNEFORD, a subject of the King of Great Britain and Ireland, residing at London, England, have invented certain new and useful Improvements in Horse-Blanket Retainers, for which I have filed an application on Mar. 31, 1917, in Great Britain, Serial No. 4,706 of 1917, which matured into Patent No. 115,062, accepted May 2, 1918, and of which the following is a specification.

This invention relates to an improved horse blanket retainer mainly designed for use in bivouac or stable to replace the surcingle and surcingle pad or roller now commonly employed.

As is well known the surcingle and surcingle pad are possessed of a number of disadvantages in practice, chief amongst which may be mentioned the fact that they exert pressure on the horse's withers and back, frequently causing galls to develop and that the blanket frequently slips off during the night.

According to the invention my improved retainer comprises a pair of bands or straps designed to be passed over the horse's shoulders, said bands or straps having the upper ends thereof furnished with suitable clips, hooks or other fastenings whereby they may be attached to the blanket on the horse's back. The lower ends of the two said bands or straps are secured to one end of a median band or strap designed to be passed back between the horse's fore-legs, the other end of said last named band or strap being provided with a pair of lateral extensions having clips, hooks or other fastenings at their extremities by means of which they can be attached to the lower part of the blanket. By this means the blanket is securely held in place by attachments at the top and bottom and without any undue pressure being exerted upon the horse.

In some cases the median band or strap may be extended in length and provided with a second pair of lateral extensions with terminal clips, hooks or other fastenings for attachment to the blanket at the rear lower part, to provide an additional security and prevent the blanket from blowing forwards.

To enable the invention to be fully understood I will describe it by reference to the accompanying drawings, in which:—

Figure 1:
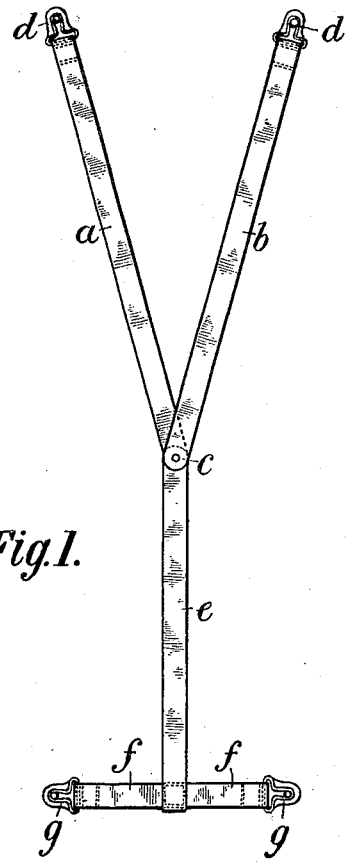
Figure 1 is an elevation of a blanket retainer made according to the invention.

Referring first to the form of the invention shown in Figure 1, $a$ and $b$ are the two shoulder bands or straps which are secured together at one end at $c$, and $d$ are the clips with which the free ends of the said bands $a$ and $b$ are fitted. $e$ is the median band or strap, one end of which is secured to the bands $a$ and $b$ at $c$, and $f$ are the lateral extensions at the other end thereof, $g$ being the clips with which the outer ends of these extensions are furnished.

Figure 2:
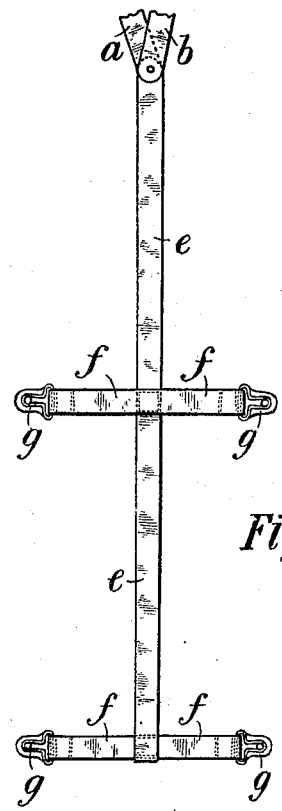
Figure 2 is a view illustrating a modification.

Figure 2 shows the constructions in which the median band or strap $e$ is extended in length and is provided with two pairs of the lateral extensions $f$ and clips $g$.

Figure 3:
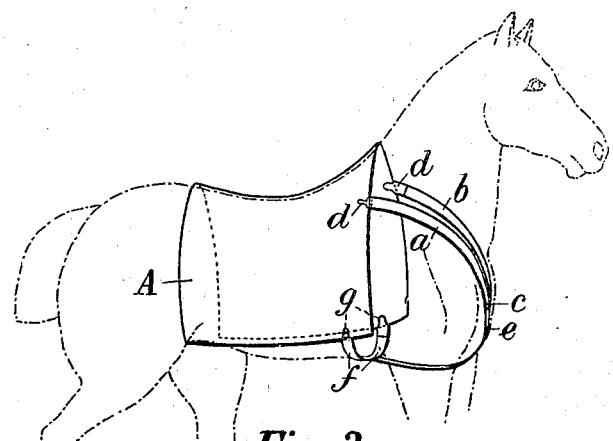
Figure 3 is a perspective view showing the retainer in use.

The retainer is used as follows, that is to say, the blanket A, Figure 3, being in place on the horse's back, the bands $a$ and $b$ are passed over the shoulders and the clips $d$ secured to the upper front end of the blanket as shown; the median band $e$ is then passed back between the horse's fore-legs and the clips $g$, upon the lateral extension, are secured the lower part of the blanket which is thus held at both top and bottom.

From the foregoing description it will be apparent that a retainer embodying my invention exerts no pressure upon any part of the horse, yet securely holds the blanket in place on the latter's back so that it entirely obviates the disadvantages inherent in the commonly used surcingle and surcingle pad.

I claim:—

A horse blanket retainer, comprising in combination, a median strap adapted to pass between the legs of a horse, a pair of shoulder straps fastened at one end of said median strap, fastening devices carried on the other ends of the shoulder straps for engagement with a blanket, a pair of lateral extensions on the other end of said median strap and fastening devices carried on the free ends of said lateral extensions for engagement with the blanket.

WETHERELL FRANCIS WARNEFORD.

Witnesses:
ARTHUR J. Q. SMITH,
FLORENCE M. STAMPTON.